US012608990B2

(12) United States Patent
Kincaid et al.

(10) Patent No.: US 12,608,990 B2
(45) Date of Patent: Apr. 21, 2026

(54) UWB-BASED MODES OF ENTRY

(71) Applicant: Schlage Lock Company LLC, Carmel, IN (US)

(72) Inventors: Ryan C. Kincaid, Indianapolis, IN (US); David Brown, Greenwood, IN (US); Joseph Land, Danville, IN (US); Justin McKee, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 191 days.

(21) Appl. No.: 18/521,074

(22) Filed: Nov. 28, 2023

(65) Prior Publication Data

US 2024/0177554 A1 May 30, 2024

Related U.S. Application Data

(60) Provisional application No. 63/428,349, filed on Nov. 28, 2022.

(51) Int. Cl.
*G07C 9/28* (2020.01)

(52) U.S. Cl.
CPC .................................... *G07C 9/28* (2020.01)

(58) Field of Classification Search
CPC .. G07C 9/28; G07C 9/00571; G07C 2209/63; G07C 9/00309

(Continued)

(56) References Cited

U.S. PATENT DOCUMENTS 6,720,861 B1 4/2004 Rodenbeck et al.
7,849,041 B2 * 12/2010 Forbes .................. G06V 20/00 706/46

(Continued)

FOREIGN PATENT DOCUMENTS

CN 102906360 A 1/2013
CN 107945316 A 4/2018

(Continued)

OTHER PUBLICATIONS

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

(Continued)

*Primary Examiner* — Nam V Nguyen

(74) *Attorney, Agent, or Firm* — Taft Stettinius & Hollister LLP

(57) ABSTRACT

A method according to an embodiment includes discovering, by a mobile device, an access control device via Bluetooth communication, authenticating, by the access control device, a credential of the mobile device over a Bluetooth communication connection established between the mobile device and the access control device, receiving, with a UWB subsystem of the access control device during a UWB ranging session between the mobile device and the access control device, UWB data indicative of a location of the mobile device relative to the access control device, determining, by the access control device, whether a user of the mobile device intends to access a passageway secured by the access control device based on the UWB data and satisfying one or more intent criteria, and performing, by the access control device, a predefined function in response to determining that the user of the mobile device intends to access the passageway.

20 Claims, 8 Drawing Sheets

(58) Field of Classification Search
USPC ........................................................ 340/5.61
See application file for complete search history.

(56) References Cited

U.S. PATENT DOCUMENTS

| | | | |
|---|---|---|---|
| 8,319,605 B2 | 11/2012 | Hassan et al. | |
| 9,196,104 B2 | 11/2015 | Dumas et al. | |
| 9,218,696 B2 | 12/2015 | Dumas et al. | |
| 9,336,637 B2 | 5/2016 | Neil et al. | |
| 9,378,598 B2 | 6/2016 | Dumas et al. | |
| 9,512,643 B1 | 12/2016 | Keefe | |
| 9,970,229 B1 | 5/2018 | Favila et al. | |
| 10,438,428 B2 * | 10/2019 | Rettig | H04W 48/04 |
| 10,453,281 B1 | 10/2019 | Lopez et al. | |
| 10,619,380 B2 | 4/2020 | Ahearn et al. | |
| 10,719,999 B2 | 7/2020 | Love et al. | |
| 10,759,389 B2 | 9/2020 | Ledvina et al. | |
| 10,760,332 B2 | 9/2020 | Kincaid et al. | |
| 11,100,734 B2 * | 8/2021 | Ahn | G06K 19/0723 |
| 11,157,734 B1 * | 10/2021 | Lipchin | G06V 10/809 |
| 11,164,411 B2 * | 11/2021 | Kuenzi | G07C 9/00904 |
| 11,210,877 B1 * | 12/2021 | Amadi | G07C 9/00309 |
| 11,368,845 B2 * | 6/2022 | Kuenzi | G07C 9/00309 |
| 11,405,784 B2 * | 8/2022 | Pirch | H04W 4/027 |
| 11,562,609 B2 | 1/2023 | Prostko et al. | |
| 11,663,864 B2 | 5/2023 | Kincaid et al. | |
| 11,900,750 B2 * | 2/2024 | Pirch | G07C 9/29 |
| 12,367,725 B2 * | 7/2025 | Sachdeva | G07C 9/00 |
| 2002/0067259 A1 | 6/2002 | Fufidio et al. | |
| 2005/0046546 A1 | 3/2005 | Masudava | |
| 2006/0164208 A1 | 7/2006 | Schaffzin et al. | |
| 2009/0002246 A1 | 1/2009 | Rabinovich et al. | |
| 2010/0201482 A1 | 8/2010 | Robertson et al. | |
| 2012/0032850 A1 | 2/2012 | Nakagawa et al. | |
| 2012/0234058 A1 | 9/2012 | Neil et al. | |
| 2013/0176107 A1 | 7/2013 | Dumas et al. | |
| 2013/0237193 A1 | 9/2013 | Dumas et al. | |
| 2013/0241694 A1 | 9/2013 | Sharma et al. | |
| 2014/0148196 A1 | 5/2014 | Bassan-Eskenazi et al. | |
| 2014/0292481 A1 | 10/2014 | Dumas et al. | |
| 2015/0121465 A1 | 4/2015 | Berns et al. | |
| 2015/0213663 A1 | 7/2015 | Dumas et al. | |
| 2015/0309487 A1 | 10/2015 | Lyman | |
| 2016/0055692 A1 | 2/2016 | Trani | |
| 2016/0086400 A1 | 3/2016 | Dumas et al. | |
| 2016/0180620 A1 | 6/2016 | Eyring et al. | |
| 2016/0189453 A1 | 6/2016 | Johnson et al. | |
| 2016/0217638 A1 | 7/2016 | Child et al. | |
| 2016/0227362 A1 | 8/2016 | Howard et al. | |
| 2016/0307385 A1 | 10/2016 | Arfwedson et al. | |
| 2016/0332598 A1 | 11/2016 | Ghabra et al. | |
| 2016/0337863 A1 | 11/2016 | Robinson et al. | |
| 2016/0350992 A1 | 12/2016 | Telljohann et al. | |
| 2017/0303090 A1 | 10/2017 | Stitt et al. | |
| 2017/0323093 A1 | 11/2017 | Liu et al. | |
| 2017/0372542 A1 | 12/2017 | Romero et al. | |
| 2018/0052217 A1 | 2/2018 | Jonsson | |
| 2018/0056939 A1 | 3/2018 | van Roermund et al. | |
| 2018/0063113 A1 | 3/2018 | Maher et al. | |
| 2018/0102008 A1 | 4/2018 | Dupart et al. | |
| 2018/0162321 A1 | 6/2018 | Spiess | |
| 2018/0242105 A1 | 8/2018 | Sute | |
| 2018/0315262 A1 | 11/2018 | Love et al. | |
| 2019/0135229 A1 | 5/2019 | Ledvina et al. | |
| 2020/0168017 A1 | 5/2020 | Prostko et al. | |
| 2020/0314651 A1 | 10/2020 | Pirch et al. | |
| 2021/0158637 A1 | 5/2021 | Kincaid et al. | |
| 2022/0207915 A1 | 6/2022 | Voss | |
| 2023/0010267 A1 | 1/2023 | Kincaid et al. | |
| 2023/0213637 A1 | 7/2023 | Brown et al. | |

FOREIGN PATENT DOCUMENTS

| | | | | |
|---|---|---|---|---|
| EP | 2930071 A1 | 10/2015 | |
| WO | 2014155255 A1 | 10/2014 | |
| WO | 2016177666 A1 | 11/2016 | |
| WO | 2017180563 A1 | 10/2017 | |
| WO | 2017180688 A1 | 10/2017 | |
| WO | 2018071671 A2 | 4/2018 | |
| WO | 2020083750 A1 | 4/2020 | |
| WO | 2020193566 A1 | 10/2020 | |
| WO | WO-2022128623 A1 * | 6/2022 | G07C 9/28 |

OTHER PUBLICATIONS

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).
Angle of arrival; Wikipedia; https://en.wikipedia.org/wiki/Angle_of_arrival; (last visited Apr. 27, 2017).
What do you want to track? Whatever you want to track, Quuppa brings you the dot on the map.; Quuppa—Do More With Location; http://quuppa.com/; (last visited Apr. 27, 2017).
Indoor Location Positioning Technology: Research, Solutions & Trends; Grizzly Analytics; http://www.grizzlyanalytics.com/report_2015_02_indoor.html; (last visited Apr. 27, 2017).
Front Page—Car Connectivity Consortium; Car Connectivity Consortium; retrieved on Jan. 13, 2021; https://carconnectivity.org/; 6 pages.
Volkswagen and NXP Show First Car Using UWB To Combat Relay Theft; EE Times; retrieved on Jan. 13, 2021; https://www.eetimes.com/volkswagen-and-nxp-show-first-car-using-uwb-to-combat-relay-theft/; 4 pages.
Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.
Front Page—UWB Alliance; UWB Alliance; retrieved on Jan. 13, 2021; https://uwballiance.org/; 11 pages.
Alliance Rallies UWB for Location Services; EE Times; retrieved on Jan. 13, 2021; https://www.eetimes.com/alliance-rallies-uwb-for-location-services/; 2 pages.
UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.
Front Page—FiRa Consortium; FiRa Consortium; retrieved on Jan. 13, 2021; https://www.firaconsortium.org/; 3 pages.
Introduction to the FiRa Consortium; FiRa Consortium; Aug. 1, 2019; 17 pages.
Ultra-Wideband (UWB) Gains Traction As A Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.
The Biggest iPhone News Is a Tiny New Chip Inside It; Wired; retrieved on Jan. 13, 2021; https://www.wired.com/story/apple-u1-chip/; 5 pages.
Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.
Ultra-Wideband (UWB); NXP; retrieved on Jan. 13, 2021; https://www.nxp.com/applications/enabling-technologies/connectivity/ultra-wideband-uwb:UWB; 7 pages.
NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.
Front Page—Decawave; Decawave; retrieved on Jan. 13, 2021; https://www.decawave.com/; 5 pages.
International Search Report; International Searching Authority; International Application No. PCT/US2023/081287; Mar. 22, 2024; 2 pages.

(56) References Cited

OTHER PUBLICATIONS

Written Opinion of the International Searching Authority; International Searching Authority; International Application No. PCT/US2023/081287; Mar. 22, 2024; 6 pages.

* cited by examiner

UWB-BASED MODES OF ENTRY

CROSS-REFERENCE TO RELATED APPLICATIONS

This application claims priority to and the benefit of U.S. Provisional Application No. 63/428,349, titled "UWB-Based Modes of Entry," filed on Nov. 28, 2022, the contents of which are incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, or token device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is directed to a unique system, components, and methods for UWB-based modes of entry. Other embodiments are directed to apparatuses, systems, devices, hardware, methods, and combinations thereof for UWB-based modes of entry.

According to an embodiment, a method may include discovering, by a mobile device, an access control device via Bluetooth communication, authenticating, by the access control device, a credential of the mobile device over a Bluetooth communication connection established between the mobile device and the access control device, receiving, with a UWB subsystem of the access control device during a UWB ranging session between the mobile device and the access control device, UWB data indicative of a location of the mobile device relative to the access control device, determining, by the access control device, whether a user of the mobile device intends to access a passageway secured by the access control device based on the UWB data and satisfying one or more intent criteria, and performing, by the access control device, a predefined function in response to determining that the user of the mobile device intends to access the passageway.

In some embodiments, determining that the one or more intent criteria have been satisfied may include determining that the mobile device is located within a predefined threshold distance relative to the access control device.

In some embodiments, determining that the one or more intent criteria have been satisfied may include determining that the mobile device is located within a predefined geometrical region.

In some embodiments, determining that the one or more intent criteria have been satisfied may include determining that the user of the mobile device has performed a predefined interaction with the access control device.

In some embodiments, determining that the one or more intent criteria have been satisfied may include determining that the user of the mobile device has made a predefined gesture relative to the access control device.

In some embodiments, determining that the one or more intent criteria have been satisfied may include determining that the user of the mobile device is located within a predefined threshold distance relative to the access control device for a threshold period of time.

In some embodiments, determining that the one or more intent criteria have been satisfied may include determining that a trajectory and speed of the mobile device are indicative of the user's intent to access the passageway.

In some embodiments, determining that the one or more intent criteria have been satisfied may include determining that the user within a predefined threshold distance or geometrical region relative to the access control device and that the user has performed a predefined interaction with the mobile device.

In some embodiments, the predefined interaction with the mobile device may include a user tapping the mobile device.

In some embodiments, performing the predefined function may include unlocking a lock mechanism of the access control device.

According to another embodiment, an access control device may include a lock mechanism configured to secure access to a passageway, an ultra-wideband (UWB) subsystem, a processor, and a memory comprising a plurality of instructions stored thereon that, in response to execution by the processor, causes the access control device to authenticate a credential of a mobile device over a Bluetooth communication connection established between the mobile device and the access control device, receive, with the UWB subsystem during a UWB ranging session between the mobile device and the access control device, UWB data indicative of a location of the mobile device relative to the access control device, determine whether a user of the mobile device intends to access the passageway secured by the lock mechanism based on the UWB data and satisfaction of one or more intent criteria, and unlock the lock mechanism in response to a determination that the user of the mobile device intends to access the passageway.

In some embodiments, to determine that the one or more intent criteria have been satisfied may include to determine that the mobile device is located within a predefined threshold distance relative to the access control device.

In some embodiments, to determine that the one or more intent criteria have been satisfied may include to determine that the mobile device is located within a predefined geometrical region.

In some embodiments, to determine that the one or more intent criteria have been satisfied may include to determine that the user of the mobile device has performed a predefined interaction with the access control device.

In some embodiments, to determine that the one or more intent criteria have been satisfied may include to determine that the user of the mobile device has made a predefined gesture relative to the access control device.

In some embodiments, to determine that the one or more intent criteria have been satisfied may include to determine that the user of the mobile device is located within a predefined threshold distance relative to the access control device for a threshold period of time.

In some embodiments, to determine that the one or more intent criteria have been satisfied may include to determine that a trajectory and speed of the mobile device are indicative of the user's intent to access the passageway.

In some embodiments, to determine that the one or more intent criteria have been satisfied may include to determine that the user within a predefined threshold distance or geometrical region relative to the access control device and that the user has performed a predefined interaction with the mobile device.

In some embodiments, the predefined interaction with the mobile device may include a user tapping the mobile device.

In some embodiments, the UWB subsystem may include a plurality of UWB antennas.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
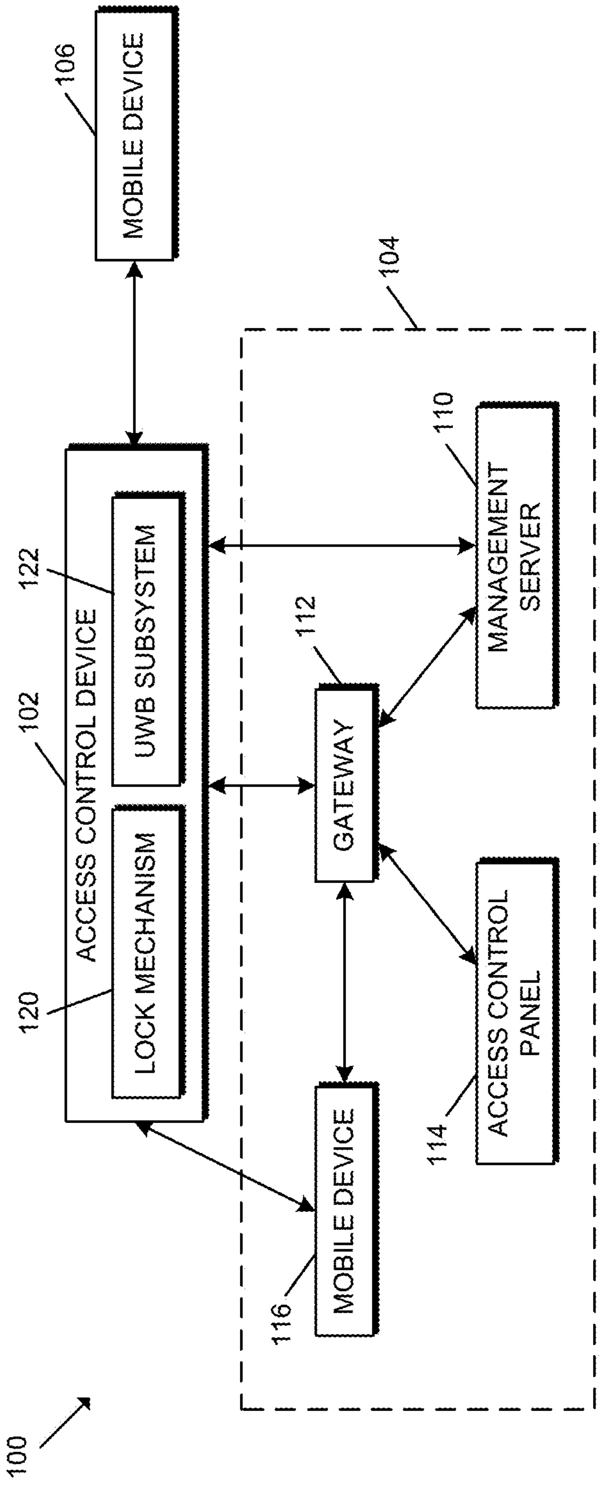
FIG. 1 is a simplified block diagram of at least one embodiment of an access control system for ultra wideband-based modes of entry.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 for ultra wideband (UWB)-based modes of entry is shown. The illustrative access control system 100 includes an access control device 102, a management system 104, and a mobile device 106. Further, the management system 104 may include a management server 110, a gateway device 112, an access control panel 114, and/or a mobile device 116. Further, as shown, the illustrative access control device 102 includes a lock mechanism 120 and a UWB subsystem 122. However, in other embodiments, it should be appreciated that the access control device 102 may be embodied as a UWB accessory device configured to perform or facilitate the UWB-based intent detection described herein, which may be communicatively coupled to an electronic lock including a lock mechanism (e.g., such as the lock mechanism 120).

As described in detail below, the access control device 102 may control and/or facilitate access to a passageway (e.g., through a doorway) via a lock mechanism 120 based on the location of the mobile device 106 (e.g., a UWB-capable smartphone, smartwatch, or wearable device) determined from UWB communication signals (UWB data) received from the mobile device 106 and one or more intent criteria. In particular, the access control device 102 may receive UWB data from the UWB subsystem 122 related to a UWB ranging session with the mobile device 106 and indicative of a distance of the mobile device 106 from the access control device 102 and an angle of arrival (AoA) of UWB signals received from the mobile device 106. The access control device 102 may perform various analyses on the UWB data and infer ingress intent of a user of the mobile device 106 if the UWB data satisfies the relevant intent criteria (e.g., being within a threshold distance of the access control device 102 or other geometrically defined area for at least a certain amount of time). If ingress intent is inferred, in some embodiments, the access control device 102 may automatically control the lock mechanism 120 without requiring user input or a physical action by the user (e.g., to unlock the lock mechanism 120). In other embodiments, the access control device 102 may control the lock mechanism 120 only if additional intent criteria are satisfied that require user interaction (e.g., the user making a particular gesture such as a hand wave, a tap on the mobile device 106, and/or other intent criteria).

It should be appreciated that the access control device 102, the management system 104, the mobile device 106, the management server 110, the gateway device 112, the access control panel 114, and/or the mobile device 116 may be embodied as any type of device or collection of devices suitable for performing the functions described herein.

More specifically, in the illustrative embodiment, the access control device 102 may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door operator, an auto-operator, a motorized latch/bolt (e.g., for a sliding door), a barrier control device (e.g., battery-powered), or a peripheral controller of a barrier to a passageway. Accordingly, in some embodiments, the access control device 102 may include a lock mechanism 120 configured to be positioned in a locked state in which access to the passageway is denied, or positioned in an unlocked state in which access to the passageway is permitted. In some embodiments, the lock mechanism 120 includes a deadbolt, latch bolt, lever, strike, and/or other mechanism adapted to move between the locked and unlocked state and otherwise perform the functions described herein. However, it should be appreciated that the lock mechanism 120 may be embodied as any another mechanism suitable for controlling access through a passageway in other embodiments. Further, in some embodiments, the access control device 102 may be associated with portable access control systems such as a bicycle lock or padlock.

Depending on the particular embodiment, the access control device 102 may include a credential reader or be electrically/communicatively coupled to a credential reader configured to communicate with the mobile device 106 and/or other credential devices. In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the management server 110).

As described herein, the access control device includes a UWB subsystem 122 for performing UWB ranging with other UWB-capable devices (e.g., the mobile device 106). The UWB subsystem 122 includes one or more UWB antennas (e.g., a plurality of UWB antennas) for wireless communication using UWB technology (e.g., using the IEEE 802.15.4 (wireless) standard). It should be appreciated that a UWB signal may be received by multiple UWB antennas, and the UWB subsystem 122 of the access control device 102 may calculate or estimate the distance and angle of arrival of the mobile device 106 based on the received UWB signal. It should be further appreciated that the number, size, and/or arrangement of UWB antennas of the UWB subsystem 122 may vary depending on the particular embodiment. Further, it should be appreciated that the access control device 102 may also include other wireless communication circuitry for communicating with the mobile device 106 and/or other devices via corresponding protocols (e.g., Wi-Fi, Bluetooth (e.g., including BLE), Zigbee, Z-Wave, Near Field Communication (NFC), Thread, etc.). For example, in some embodiments, the mobile device 106 and/or the access control device 102 may perform a Bluetooth High Accuracy Distance Measurement (HADM) based on Bluetooth communication signals transmitted between the mobile device 106 and the access control device 102.

In the illustrative embodiment, the mobile device 106 may be embodied as any mobile device capable of communicating with the access control device 102 via UWB signals (e.g., for UWB ranging), exchanging credential information with the access control device 102, and/or otherwise performing the functions described herein. Accordingly, in some embodiments, in addition to having UWB communication circuitry, it should be appreciated that the mobile device 106 may also include other wireless communication circuitry for communicating with the access control device 102 and/or other devices via corresponding protocols (e.g., Wi-Fi, Bluetooth (e.g., including BLE), Zigbee, Z-Wave, Near Field Communication (NFC), Thread, Matter, etc.). It should be appreciated that, in some embodiments, the mobile device 106 may be embodied as a UWB-enabled smartphone, smartwatch, wearable computing device, UWB fob, or UWB tag device.

As described herein, in some embodiments, the mobile device 106 may be configured to perform the various functions described herein (see, for example, the method 300 of FIG. 3) in addition to or in the alternative to the access control device 102. Further, in some embodiments, the mobile device 106 may leverage sensor data to validate various data and/or otherwise improve the accuracy of the functions described herein. In particular, in some embodiments, the mobile device 106 may include an inertial measurement unit (IMU) including, for example, an accelerometer, gyroscope, and/or magnetometer that generates inertial data associated with the mobile device 106, which may be used to verify the velocity/heading of the mobile device 106. In other embodiments, the mobile device 106 may include environmental sensors (e.g., temperature sensors, air pressure sensors, humidity sensors, light sensors, etc.), inertial sensors (e.g., accelerometers, gyroscopes, etc.), magnetometers, proximity sensors, optical sensors, electromagnetic sensors, audio sensors (e.g., microphones), motion sensors, cameras, piezoelectric sensors, pressure sensors, switches (e.g., reed switches), and/or other types of sensors.

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the mobile device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the mobile device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one mobile device 106, one management server 110, one gateway device 112, one access control panel 114, and one mobile device 116 are shown in the illustrative embodiment of FIG. 1, the system 100 may include multiple access control devices 102, management systems 104, mobile devices 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate mobile devices 106 in some embodiments.

Figure 2:
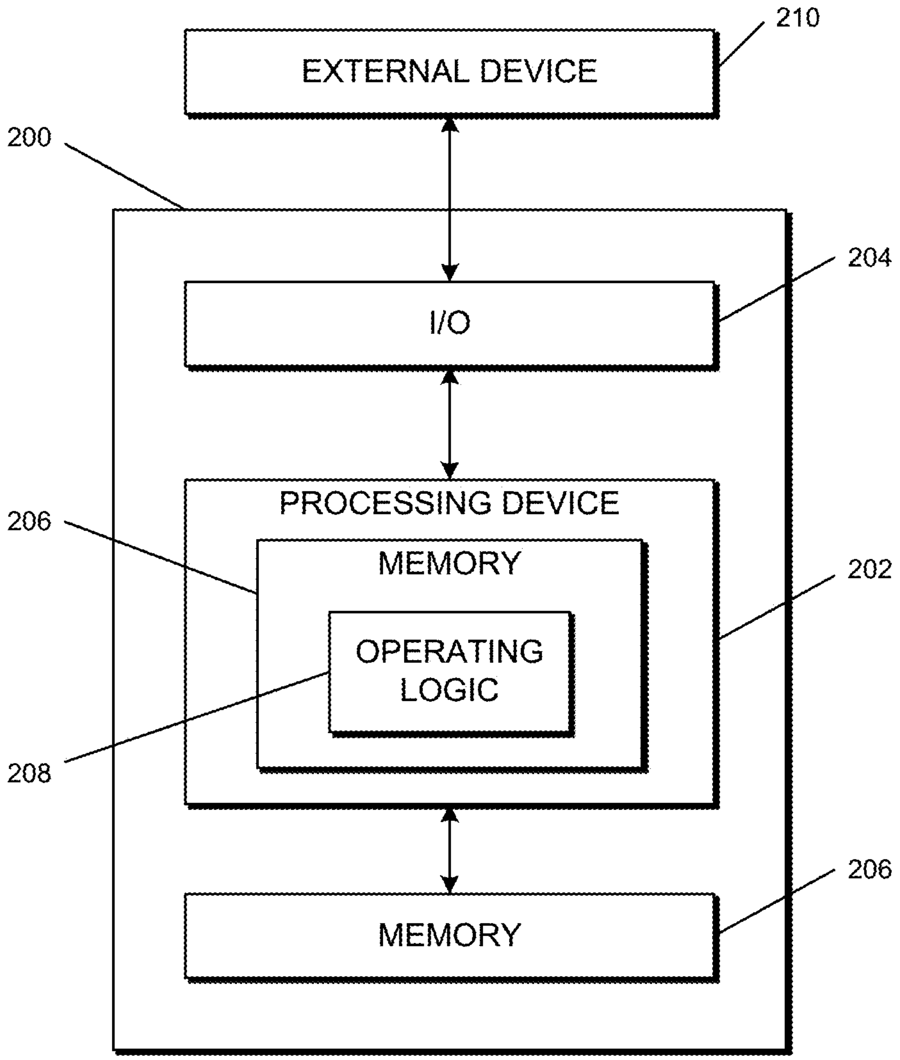
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an access control device, mobile device, management server, gateway device, and/or access control panel that may be utilized in connection with the access control device 102, the management system 104, the mobile device 106, the management server 110, the gateway device 112, the access control panel 114, and/or the mobile device 116 illustrated in FIG. 1. Depending on the particular embodiment, computing device 200 may be embodied as a reader device, credential device, access control device, UWB-capable device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the mobile device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
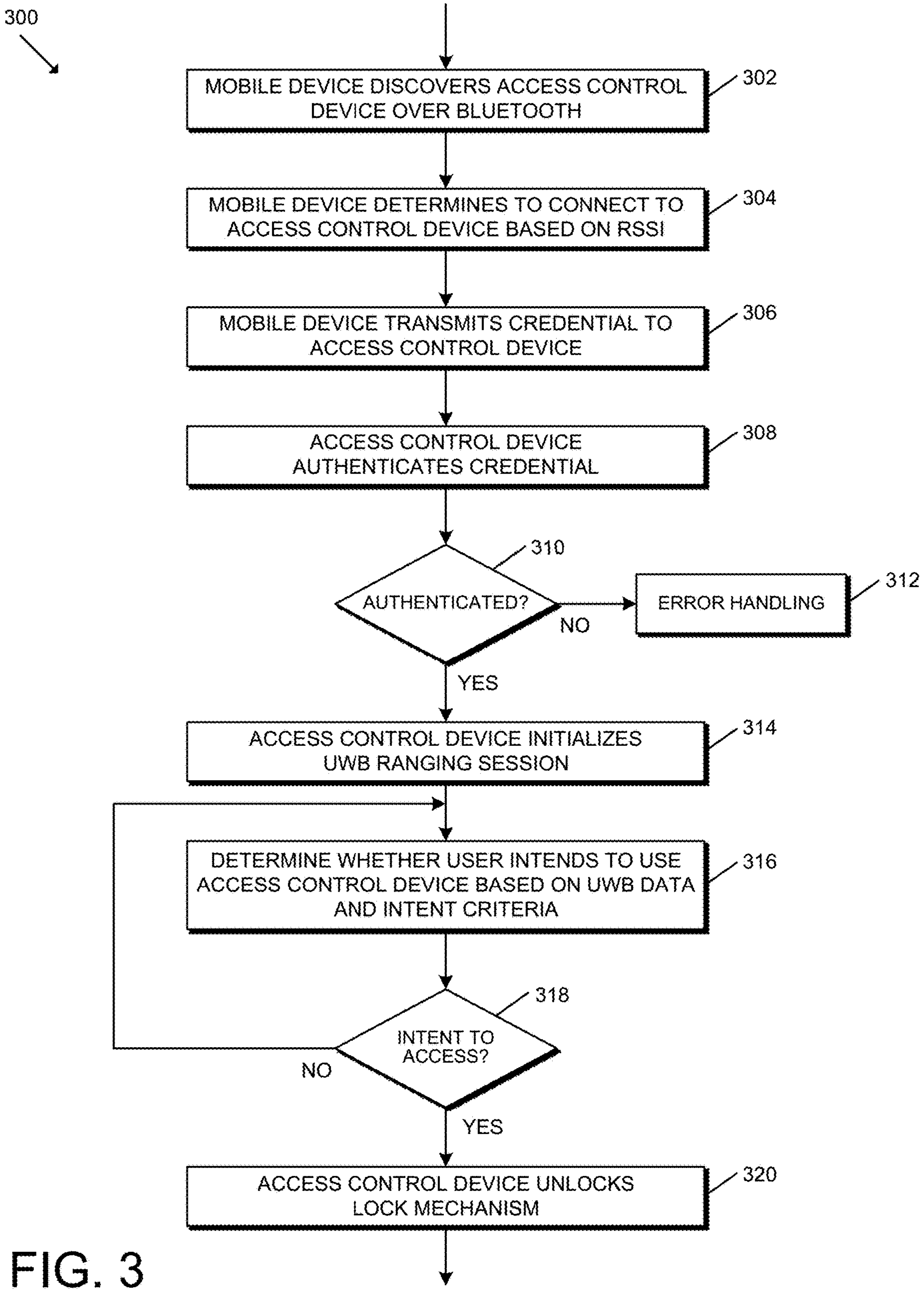
FIG. 3 is a simplified flow diagram of at least one embodiment of a method for one or more ultra wideband-based modes of entry.

It should be appreciated that the system 100 may utilize one of various different UWB-based modes of entry described herein to gain access through the access control device 102 based on UWB data (e.g., indicative of the location of the mobile device 106 relative to the access control device 102) and satisfaction of one or more intent criteria associated with the corresponding mode of entry (e.g., in executing the method 300 of FIG. 3). More specifically, in various embodiments, the system 100 may utilize a "touch and go" mode as described and depicted in reference to FIG. 4, a "tap and go" mode as described and depicted in reference to FIG. 5, a "wait and go" mode as described and depicted in reference to FIG. 6, a "go" mode as described and depicted in reference to FIG. 7, and a "double tap and go" mode as described and depicted in reference to FIG. 8. It should be appreciated that the names of the particular UWB-based modes of entry used in this disclosure (e.g., "touch and go" mode, "tap and go" mode, "wait and go" mode, "go" mode, "double tap and go" mode, etc.) are for reference only and not intended to limit the disclosure. In some embodiments, the various entry modes may be assigned and/or selected depending on the credential, selected by the system 100 (e.g., via an application and user interface of the user and/or administrator), desired user experience or security level, and/or other characteristics. The UWB-based modes of entry described herein may provide unique user experiences, or modes of entry, as the user (and the user's mobile device 106) interacts with the access control device 102. For example, the possible modes of entry may exist on a spectrum ranging from "significant user intervention required" to "no user intervention required."

Referring now to FIG. 3, in use, the access control device 102 and/or the mobile device 106 may execute (e.g., in firmware) a method 300 for one or more ultra wideband-based modes of entry. It should be appreciated that the particular blocks of the method 300 are illustrated by way of example, and such blocks may be combined or divided, added or removed, and/or reordered in whole or in part depending on the particular embodiment, unless stated to the contrary. As described herein, it should be appreciated that the method 300 (or portions thereof) may be executed by the access control device 102 and/or mobile device 106 in various embodiments. Further, although the techniques described herein are primarily in reference to two-dimensional determinations, it should be appreciated that three-dimensional data may be used in some embodiments. For example, in some circumstances, the elevation of the mobile device 106 may skew various data. Accordingly, in some embodiments, the access control device 102 may project a three-dimensional data point to two-dimensional space (e.g., the plane of the access control device 102 extending outward horizontally) or otherwise convert three-dimensional data points to two-dimensional data points in order to provide further robustness (e.g., during and/or after a calibration phase).

The illustrative method 300 begins with block 302 in which the mobile device 106 discovers the access control device 102 over Bluetooth communication. For example, in some embodiments, the access control device 102 may monitor for one or more Bluetooth/BLE advertisements, messages, or signals to be received from a mobile device 106 within a communication range of the access control device 102. In some embodiments, the access control device 102 may advertise itself (e.g., via Bluetooth/BLE or another suitable communication protocol) and await a response from a mobile device 106 within communication range of the access control device 102 (e.g., through which the mobile device 106 discovers the access control device 102). In some embodiments, it should be appreciated that the access control device 102 may monitor for mobile devices 106 within some distance less than the maximum communication range of the relevant protocol (e.g., Bluetooth/BLE). In other embodiments, it should be appreciated that the mobile device 106 may function as the device that transmits advertisements, messages, or other signals to be received by access control devices 102 when those devices are within communication range of the mobile device 106.

In block 304, the mobile device 106 determines to connect to the access control device 102 based on a Received Signal Strength Indicator (RSSI) value and/or other data indicative of the relative location of the mobile device 106 to the access control device 102. For example, in some embodiments, the mobile device 106 only connects with the access control device 102 (e.g., over Bluetooth/BLE) if the mobile device 106 is within some threshold distance from the access control device 102 less than the maximum communication distance (e.g., of Bluetooth/BLE), which may be determined based on RSSI data, time of flight (ToF) data, and/or other data that indicates the relative distance of the access control device 102 to the mobile device 106. It should be appreciated that the mobile device 106 may utilize a Bluetooth High Accuracy Distance Measurement (HADM) and/or other data indicative of the relative distance in other embodiments.

In block 306, the mobile device 106 transmits a credential to the access control device 102 over a Bluetooth/BLE communication connection established between the mobile device 106 and the access control device 102. In block 308, the access control device 102 authenticates the credential of the mobile device 106 received via the Bluetooth/BLE communication to determine whether the mobile device 106 and/or the user thereof is authorized to access the passageway (e.g., whether the user is authorized to control an access control mechanism of the access control device 102) and/or another aspect of the access control device 102 or system 100. Depending on the particular embodiment, it should be appreciated that the credential data may be processed by the access control device 102 and/or by the management system 104 (e.g., at a host server, management server 110, and/or access control panel 114).

If the access control device 102 determines, in block 310, that the authentication was not successful (e.g., based on an improper credential), the method 300 advances to block 312 in which the access control system 100 handles the error using any suitable technique and/or mechanism. For example, in some embodiments, the access control system 100 may generate an audit, alert, and/or alarm related to the unsuccessful authentication.

If the access control device 102 determines, in block 310, that the authentication was successful, the method 300 advances to block 314 in which the access control device 102 initializes UWB ranging/localization (e.g., by initializing a UWB ranging session and monitoring/analyzing the corresponding UWB data) with the mobile device 106 via the UWB subsystem 122. During the UWB ranging session, the access control device 102 may analyze various UWB data indicative of a distance of the mobile device 106 from the access control device 102, an angle of arrival of the mobile device 106 (e.g., based on an angle of arrival of a UWB signal received from the mobile device 106), and/or other relevant UWB data. For example, the UWB data from the UWB subsystem 122 may include distance and angle/AoA data. Although described in the singular for convenience and brevity of the description, it should be appreciated that the UWB data may include multiples of the UWB data in various embodiments (e.g., multiple angle/AoA measurements). It should be further appreciated that, in some embodiments, the UWB data from the UWB subsystem 122 may include non-line-of-sight (NLOS) data, signal noise ratio (SNR) data, received signal strength indicator (RSSI) data, and/or other data. It should be appreciated that the access control device 102 may determine the location of the mobile device 106 relative to the access control device 102 based on the location of the mobile device 106 relative to the access control device 102. It should be further appreciated that the access control system 100 may define a set of locations and/or movements of the mobile device 106 that correspond with an intent of the corresponding user to access the passageway secured by the access control device 102 as described in greater detail herein. For example, in some embodiments, the mobile device 106 may be nearby the access control device 102 (e.g., within a certain distance, within a certain angle range, on the correct side of the passageway, etc.) such that it is indicative of the user's intent to access the passageway.

In block 316, the access control device 102 determines whether the user intends to use or access the access control device 102 (e.g., to control the lock mechanism 120 or another function of the access control device 102) based on the UWB data (e.g., the location of the mobile device 106 relative to the access control device 102) and one or more intent criteria indicative of user intent to use or access the access control device 102. It should be appreciated that the access control device 102 may utilize any suitable intent algorithm for determining whether the user intends to use the access control device 102, for example, to access a passageway secured by the access control device 102. In particular, each of the UWB-based modes of entry described herein may be associated with a different set of intent criteria, which are described in further detail below.

If the access control device 102 determines, in block 318, that the UWB data and/or intent criteria are not indicative of the user's intent to use/access the access control device 102, the method 300 returns to block 316 in which the access control device 102 again determines the location of the mobile device 106 based on updated UWB data and evaluates the relevant intent criteria. In other words, the access control device 102 may monitor the location/movement of the mobile device 106 and any other data associated with corresponding intent criteria (e.g., sensor data, etc.) over time as the mobile device 106 moves relative to the access control device 102 and/or the status of data relevant to the intent criteria changes. In some embodiments, the method 300 may "timeout" if the access control device 102 does not determine an intent to access within a predefined timeout period.

If the access control device 102 determines, in block 318, that the UWB data and intent criteria are indicative of the user's intent to use/access the access control device 102, the method 300 advances to block 320 in which the access control device 102 controls the lock mechanism 120 and/or another access control mechanism to unlock the lock mechanism and/or otherwise allow access through the passageway. Further, in some embodiments, the access control device 102 may automatically open the barrier. Although described herein primarily in reference to unlocking the lock mechanism 120 of the access control device 102, it should be appreciated that, in other embodiments, the access control device 102 may react to the intent to access with one or more other predefined functions.

Although the blocks 302-320 are described in a relatively serial manner, it should be appreciated that various blocks of the method 300 may be performed in parallel and/or in another order in some embodiments. For example, in another embodiment, one or more of the intent criteria (e.g., a user's hand wave) may be evaluated prior to authentication of the credential of the mobile device 106 and/or other features of the method 300 of FIG. 3.

As described above, it should be appreciated that the system 100 may utilize one of various different UWB-based modes of entry described herein to gain access through the access control device 102 based on UWB data (e.g., indicative of the location of the mobile device 106 relative to the access control device 102) and one or more intent criteria associated with the corresponding mode of entry (e.g., in executing block 316 of the method 300 of FIG. 3). FIGS. 4-8 illustrates various access control dynamics that occur in conjunction with such possible UWB-based modes of entry.

FIGS. 4-8 depict a passageway 402 defined in a wall 404 and secured by a door 406. The illustrative access control device 102 is secured to the door 406. However, it should be appreciated that the access control device 102 may be secured to the wall 404 nearby the door 406 in other embodiments. Accordingly, in some embodiments, it should be appreciated that the access control device 102 may be embodied as a wall-mounted reader, UWB accessory device, electric strike, and/or other wall-mounted access control device. Although FIGS. 4-8 depict various interactions in two dimensions, it should be appreciated that the corresponding intent determinations may be calculated in three dimensions in some embodiments.

Figure 4:
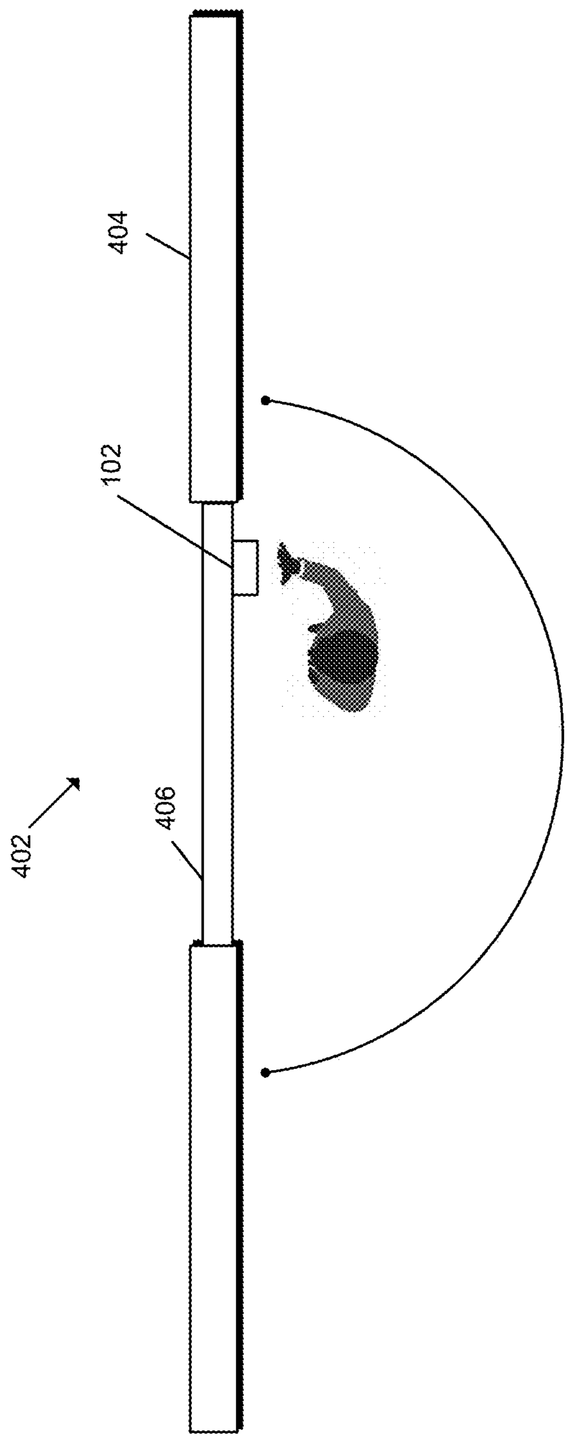
FIG. 4 is a simplified illustration of access control dynamics involving an ultra wideband-based "touch and go" mode.

Referring now specifically to FIG. 4, the "touch and go" mode is illustrated in which the mobile device 106 (e.g., a UWB-enabled smartphone, wearable device, or fob) is in the user's possession. For example, the mobile device 106 may be in the user's hand, in the user's pocket, in a backpack, handbag, or satchel carried by the user, or otherwise in the user's possession. The lock mechanism 120 (e.g., deadbolt) is unlocked when the user signals intent by touching or interacting with the access control device 102, such as via a gesture (e.g., a hand wave), while the mobile device 106 is within a predefined (e.g., configurable) distance (e.g., 2-3 feet) from the access control device 102 or another predefined reference point (e.g., the center of the door 406). In other words, the intent criteria described above in the "touch and go" mode are that the mobile device 106 is located within the predefined distance and the user performs the relevant intent action (e.g., hand wave). However, it should be appreciated that various other forms of intent detection may be used as intent criteria in other embodiments including, for example, Wi-Fi occupancy detection, camera imaging (e.g., to detect user presence with or without user identification), PIR sensing, thermal imaging, breaking laser beam, sonar, radar, capacitive sensing, tapping the access control device 102, and/or other criteria. It should be appreciated that the "touch and go" mode benefits from a fast reaction time with the desired function.

Figure 5:
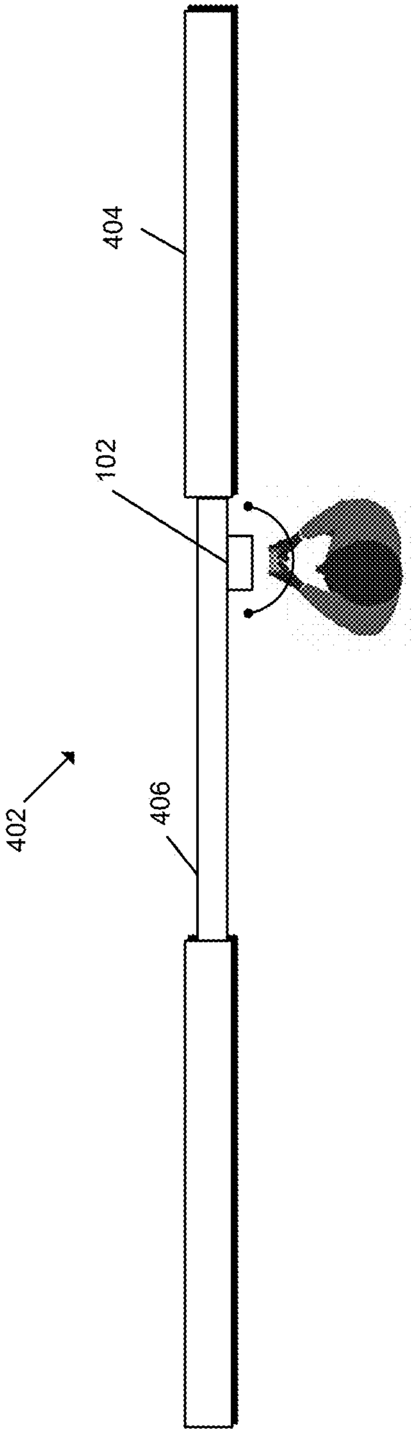
FIG. 5 is a simplified illustration of access control dynamics involving an ultra wideband-based "tap and go" mode.

Referring now specifically to FIG. 5, the "tap and go" mode is illustrated in which the mobile device 106 (e.g., a UWB-enabled smartphone, wearable device, or fob) is in the user's hand. The lock mechanism 120 (e.g., deadbolt) is unlocked when the mobile device 106 is within a very close distance to the access control device 102, such as a close enough distance to the access control device 102 that the user could tap the mobile device 106 on the access control device 102 (e.g., within a 6 inch radius). In essence, the "tap and go" mode may simulate the experience of NFC-based access control, thereby giving users and administrators the peach of mind that the mobile device 106 is required to be within a tight proximity of the access control device 102 to function like an NFC reader without requiring the NFC communication circuitry (which is instead simulated via the UWB-based mode of entry).

Figure 6:
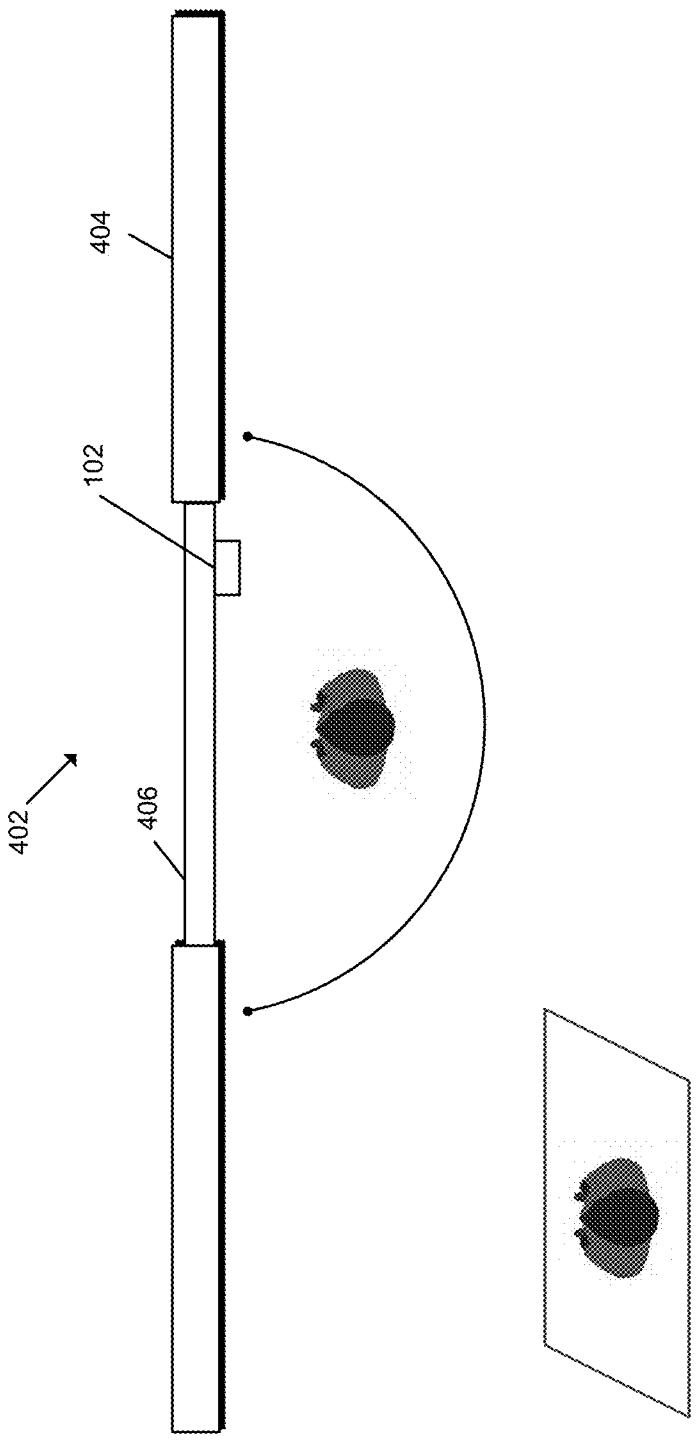
FIG. 6 is a simplified illustration of access control dynamics involving an ultra wideband-based "wait and go" mode.

Referring now specifically to FIG. 6, the "wait and go" mode is illustrated in which the mobile device 106 (e.g., a UWB-enabled smartphone, wearable device, or fob) is in the user's possession. For example, the mobile device 106 may be in the user's hand, in the user's pocket, in a backpack, handbag, or satchel carried by the user, or otherwise in the user's possession. The lock mechanism 120 (e.g., deadbolt) is unlocked when the mobile device 106 is within a predefined (e.g., configurable) distance (e.g., 3 feet) from the access control device 102 or another predefined reference point (e.g., the center of the door 406), or within some other predefined region (e.g., with a configurable geometry), for a threshold period of time (e.g., 3 seconds). It should be further appreciated that the access control device 102 may provide audible or visual feedback to the user as the user moves nearby, a timer countdown occurs, and/or the user otherwise interacts with the system 100. In particular, the access control device 102 may include a display device that displays a graphical user interface with feedback to the user of the mobile device 106 (e.g., indicating that the user is being tracked by the access control device 102 and/or to otherwise convey information to the user). For example, the display device may be embodied as or include LEDs, a display screen, a light ring (or other shape), and/or another indicator device.

Figure 7:
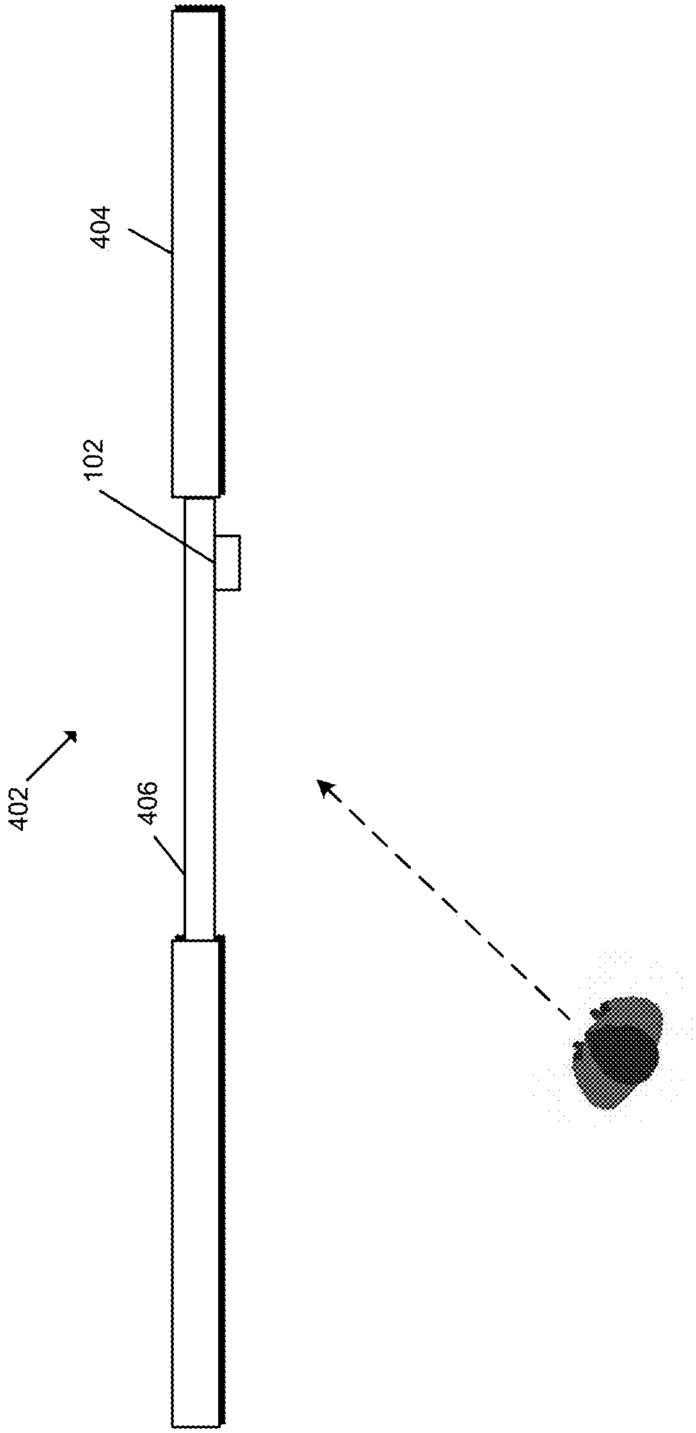
FIG. 7 is a simplified illustration of access control dynamics involving an ultra wideband-based "go" mode.

Referring now specifically to FIG. 7, the "go" mode is illustrated in which the mobile device 106 (e.g., a UWB-enabled smartphone, wearable device, or fob) is in the user's possession. For example, the mobile device 106 may be in the user's hand, in the user's pocket, in a backpack, handbag, or satchel carried by the user, or otherwise in the user's possession. The lock mechanism 120 (e.g., deadbolt) is unlocked when the user's location, trajectory, and/or other motion (inferred based on such characteristics of the mobile device 106) is indicative of the user's intent to use/access the access control device 102. It should be appreciated that the intent algorithm may incorporate the user's heading, speed, and/or other trajectory-related factors into determining user intent.

Figure 8:
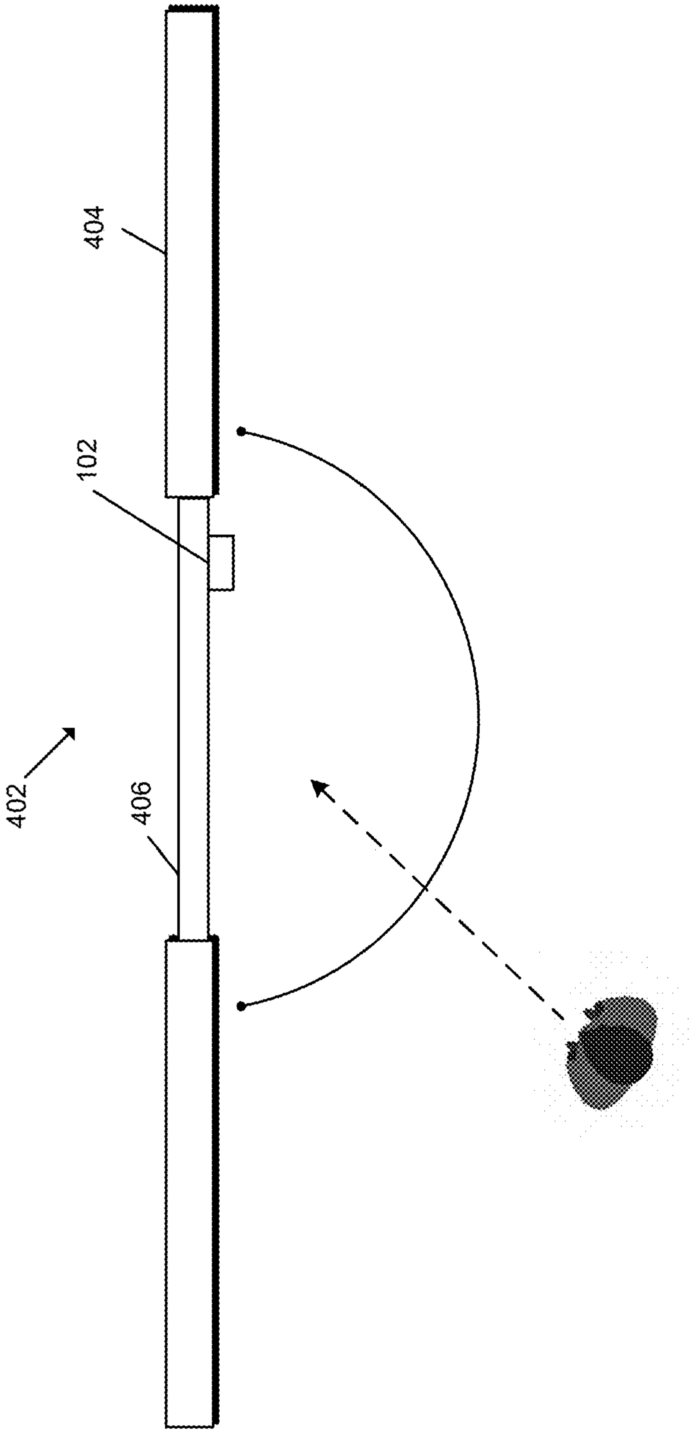
FIG. 8 is a simplified illustration of access control dynamics involving an ultra wideband-based "double tap and go" mode.

Referring now specifically to FIG. 8, the "double tap and go" mode is illustrated in which the mobile device 106 (e.g., a UWB-enabled smartphone, wearable device, or fob) is in the user's possession. For example, the mobile device 106 may be in the user's hand, in the user's pocket, or otherwise in the user's possession in a manner in which the user can interact with the mobile device 106. The lock mechanism 120 (e.g., deadbolt) is unlocked when the mobile device 102 is within a predefined distance from the access control device 102 or within some other predefined geometric region, and the user signals intent by interacting with the mobile device 106 one or more times as the user approaches the access control device 102 (e.g., by double tapping the mobile device 106 within the user's pocket).

It should be appreciated that the system 100 may be used to simultaneously monitor the location of multiple mobile devices 106, each of which may have valid credentials. Further, in some embodiments, multiple mobile devices 106 may be associated with the same user (e.g., a mobile phone of the user and a wearable computing device of the user), and those mobile devices 106 may even have the same credential. Accordingly, in such embodiments, the system 100 (e.g., the access control device 102 and/or the mobile device 106) may determine which mobile device 106 of the user for which to monitor the location (or the system 100 may monitor the location of both mobile devices 106).

It should be further appreciated that the access control device 102 may be configured such that the same entry mode is used for each mobile device 106, whereas in other embodiments, the access control device 102 may be configured to allow each mobile device 106 to be configured to operate in an individually configured entry mode. For example, a first mobile device 106 may be configured to operate with a particular access control device 102 according to a first entry mode (e.g., "wait and go" mode), whereas a second mobile device 106 may be configured to operate with the same access control device 102 according to a second entry mode (e.g., "go" mode). Accordingly, the access control device 102 may be configured to simultaneously handle access control and intent-related processing relating to multiple entry modes (for multiple mobile devices 106) in parallel.

In some embodiments, the access control device 102 may be configured to fall back or transition from one entry mode to another entry mode based on one or more criteria. For example, in an embodiment, the access control device 102 may fall back from "go" mode into "wait and go" mode based on one or more criteria, or the access control device 102 may fall back from "go" mode into "touch and go" mode based on one or more criteria. In some embodiments, the criteria may be related to signal quality and/or other data associated with the reliability of the input data for the associated intent algorithms. For example, if there are large obstructions between the access control device 102 and the mobile device 106, the access control device 102 may be unable to reliably track the mobile device 106 until the mobile device 106 is nearer the access control device 102, and therefore the access control device 102 may transition to an entry mode that relies on near-range distance determinations.

In some embodiments, the system 100 (e.g., the access control device 102) may analyze the collective entry mode and/or corresponding intent algorithm states of all of the mobile devices 106 being monitored. For example, a particular system 100 or access control device 102 may be configured to limit the number of users that may pass through a door over a predefined period of time (e.g., three seconds), such as to prevent people from lining up directly in front of the door, tailgating, and/or otherwise inappropriately passing through the door. Accordingly, in some embodiments, the access control device 102 may delay unlocking the lock mechanism until there is sufficient distance (e.g., a predefined distance threshold) between mobile devices 106 as a user approaches the door.

What is claimed is:

1. A method, comprising:

authenticating, by the access control device, a first credential of a first mobile device over a first Bluetooth communication connection established between the first mobile device and the access control device;

authenticating, by the access control device, a second credential of a second mobile device over a second Bluetooth communication connection established between the second mobile device and the access control device;

receiving, with an ultra-wideband (UWB) subsystem of the access control device during a UWB ranging session between the first mobile device and the access control device, first UWB data indicative of a location of the first mobile device relative to the access control device;

receiving, with the UWB subsystem during a UWB ranging session between the second mobile device and the access control device, second UWB data indicative of a location of the second mobile device relative to the access control device;

determining, by the access control device, whether a user of the first mobile device intends to access a passageway secured by the access control device based on the first UWB data and satisfying a first set of one or more intent criteria associated with a first mode of entry;

determining, by the access control device, whether a user of the second mobile device intends to access the passageway based on the second UWB data and satisfying a second set of one or more intent criteria associated with a second mode of entry, wherein the second set is different from the first set; and performing, by the access control device, a predefined function in response to determining that one of the user of the first mobile device or the user of the second mobile device intends to access the passageway.

2. The method of claim 1, wherein determining that the first set of one or more intent criteria have been satisfied comprises determining that the first mobile device is located within a predefined threshold distance relative to the access control device.

3. The method of claim 1, wherein determining that the first set of one or more intent criteria have been satisfied comprises determining that the first mobile device is located within a predefined geometrical region.

4. The method of claim 1, wherein determining that the first set of one or more intent criteria have been satisfied comprises determining that the user of the first mobile device has performed a predefined interaction with the access control device.

5. The method of claim 1, wherein determining that the first set of one or more intent criteria have been satisfied comprises determining that the user of the first mobile device has made a predefined gesture relative to the access control device.

6. The method of claim 1, wherein determining that the first set of one or more intent criteria have been satisfied comprises determining that the user of the first mobile device is located within a predefined threshold distance relative to the access control device for a threshold period of time.

7. The method of claim 1, wherein determining that the first set of one or more intent criteria have been satisfied comprises determining that a trajectory and speed of the first mobile device are indicative of an intent of the user of the first mobile device to access the passageway.

8. The method of claim 1, wherein determining that the first set of one or more intent criteria have been satisfied comprises determining that the first mobile device is within a predefined threshold distance or geometrical region relative to the access control device and that the user of the first mobile device has performed a predefined interaction with the first mobile device.

9. The method of claim 8, wherein the predefined interaction with the first mobile device comprises a user tapping the first mobile device without removing the first mobile device from a pocket, backpack, handbag, or satchel carried by the user of the first mobile device.

10. The method of claim 1, wherein performing the predefined function comprises unlocking a lock mechanism of the access control device further in response to a determination that fewer than a threshold number of users have accessed the passageway over a predefined period of time.

11. The method of claim 1, further comprising delaying, by the access control device, performance of the predefined function until there is at least a threshold distance between the first mobile device and the second mobile device.

12. The method of claim 1, further comprising initiating the UWB ranging session between the first mobile device and the access control device in response to successful authentication of the first credential of the first mobile device over the first Bluetooth communication connection established between the first mobile device and the access control device.

13. The method of claim 1, further comprising:

determining, by the access control device, that a signal quality of one or more signals received from the first mobile device is of poor quality; and determining, by the access control device, whether the user of the first mobile device intends to access the passageway based on the first UWB data and satisfying a third set of one or more intent criteria associated with a fallback mode of entry in response to determining that the signal quality of the one or more signals received from the first mobile device is of poor quality.

14. An access control device, comprising:

a lock mechanism configured to secure access to a passageway;

an ultra-wideband (UWB) subsystem;

a processor; and a memory comprising a plurality of instructions stored thereon that, in response to execution by the processor, causes the access control device to:

authenticate a first credential of a first mobile device over a first Bluetooth communication connection established between the first mobile device and the access control device;

authenticate a second credential of a second mobile device over a second Bluetooth communication connection established between the second mobile device and the access control device;

receive, with the UWB subsystem during a UWB ranging session between the first mobile device and the access control device, first UWB data indicative of a location of the first mobile device relative to the access control device;

receive, with the UWB subsystem during a UWB ranging session between the second mobile device and the access control device, second UWB data indicative of a location of the second mobile device relative to the access control device;

determine whether a user of the first mobile device intends to access the passageway secured by the lock mechanism based on the first UWB data and satisfaction of a first set of one or more intent criteria associated with a first mode of entry;

determine whether a user of the second mobile device intends to access the passageway based on the second UWB data and satisfaction of a second set of one or more intent criteria associated with a second mode of entry, wherein the second set is different from the first set; and unlock the lock mechanism in response to a determination that the user of the first mobile device or the user of the second mobile device intends to access the passageway.

15. The access control device of claim 14, wherein to determine that the first set of one or more intent criteria have been satisfied comprises to determine that the first mobile device is located within a predefined threshold distance relative to the access control device.

16. The access control device of claim 14, wherein to determine that the first set of one or more intent criteria have been satisfied comprises to determine that the user of the first mobile device has performed a predefined interaction with the access control device.

17. The access control device of claim 14, wherein to determine that the first set of one or more intent criteria have been satisfied comprises to determine that the user of the first mobile device has made a predefined gesture relative to the access control device.

18. The access control device of claim 14, wherein to determine that the first set of one or more intent criteria have been satisfied comprises to determine that the user of the first mobile device is located within a predefined threshold distance relative to the access control device for a threshold period of time.

19. The access control device of claim 14, wherein to determine that the first set of one or more intent criteria have been satisfied comprises to determine that a trajectory and speed of the first mobile device are indicative of an intent of the user of the first mobile device to access the passageway.

20. The access control device of claim 14, wherein to determine that the first set of one or more intent criteria have been satisfied comprises to determine that the first mobile device is within a predefined threshold distance or geometrical region relative to the access control device and that the user of the first mobile device has performed a predefined interaction with the mobile device.

* * * * *